(12) United States Patent
Brunot et al.

(10) Patent No.: US 11,053,599 B2
(45) Date of Patent: Jul. 6, 2021

(54) PROCESS FOR STARTING MODE OR STAND-BY MODE OPERATION OF A POWER-TO-GAS UNIT COMPRISING A PLURALITY OF HIGH-TEMPERATURE ELECTROLYSIS (SOEC) OR CO-ELECTROLYSIS REACTORS

(71) Applicant: COMMISSARIAT A L'ENERGIE ATOMIQUE ET AUX ENERGIES ALTERNATIVES, Paris (FR)

(72) Inventors: Aymeric Brunot, Corenc (FR); Vincent Lacroix, Grenoble (FR)

(73) Assignee: COMMISSARIAT A L'ENERGIE ATOMIQUE ET AUX ENERGIES ALTERNATIVES, Paris (FR)

(*) Notice: Subject to any disclaimer, the term of this patent is extended or adjusted under 35 U.S.C. 154(b) by 308 days.

(21) Appl. No.: 16/227,252

(22) Filed: Dec. 20, 2018

(65) Prior Publication Data
US 2019/0194816 A1    Jun. 27, 2019

(30) Foreign Application Priority Data
Dec. 22, 2017    (FR) ...................................... 17 62904

(51) Int. Cl.
| | | |
|---|---|---|
| C25B 15/08 | (2006.01) | |
| C25B 1/00 | (2021.01) | |
| C25B 1/04 | (2021.01) | |
| C25B 3/25 | (2021.01) | |
| C25B 9/65 | (2021.01) | |
| C25B 9/73 | (2021.01) | |
| C25B 11/031 | (2021.01) | |

(Continued)

(52) U.S. Cl.
CPC ................ *C25B 15/08* (2013.01); *C25B 1/00* (2013.01); *C25B 1/04* (2013.01); *C25B 3/00* (2013.01); *C25B 3/25* (2021.01); *C25B 9/65* (2021.01); *C25B 9/73* (2021.01); *C25B 11/031* (2021.01); *C25B 11/069* (2021.01); *C25B 15/02* (2013.01); *C10L 3/08* (2013.01)

(58) Field of Classification Search
CPC ....................................................... C25B 15/08
See application file for complete search history.

(56) References Cited

U.S. PATENT DOCUMENTS

| | | | |
|---|---|---|---|
| 2009/0289227 A1 | 11/2009 | Rising | |
| 2016/0107952 A1* | 4/2016 | Schulz | ...................... C25B 1/04 422/111 |
| 2016/0355932 A1 | 12/2016 | Reytier et al. | |

FOREIGN PATENT DOCUMENTS

| | | |
|---|---|---|
| EP | 2931943 B1 | 10/2015 |
| EP | 3077574 B1 | 10/2017 |
| WO | 2015/083024 A1 | 6/2015 |

OTHER PUBLICATIONS

Ademe, GRTgaz, GrDF, "Etude portant sur l'hydrogène et la méthanation comme procédé de valorisation de l'électricité excédentaire" ["Study relating to hydrogen and methanation as a process for exploiting excess electricity"]; Sep. 2014; 5.

(Continued)

*Primary Examiner* — Nicholas A Smith
(74) *Attorney, Agent, or Firm* — Pearne & Gordon LLP

(57) ABSTRACT

The application relates to a process for operating in starting mode or in stand-by mode a unit, termed power-to-gas unit, comprising a number N of reactors (1) with a stack of elemental electrolysis cells of solid oxide type (SOEC), the cathodes of which are made of methanation reaction catalyst material(s).

11 Claims, 3 Drawing Sheets

(51) Int. Cl.
   *C25B 11/069*   (2021.01)
   *C25B 3/00*     (2021.01)
   *C25B 15/02*    (2021.01)
   *C10L 3/08*     (2006.01)

(56) References Cited

OTHER PUBLICATIONS

Kötter et al., "Sensitivities of Power-to-Gas within an optimized Energy System"; ScienceDirect; Energy Procedia 73 (2015); pp. 190-199; IRES-2015.
Nowakowski et al., "Energy Storage for a Greenhouse Gas Neutral Society : Demand and Long-term Strategy"; Federal Environment Agency, Section I 2.2; IRES-2015 (2015).
French Preliminary Search Report from Corresponding French Application No. FR 1762904 dated Oct. 2, 2018.

\* cited by examiner

PROCESS FOR STARTING MODE OR STAND-BY MODE OPERATION OF A POWER-TO-GAS UNIT COMPRISING A PLURALITY OF HIGH-TEMPERATURE ELECTROLYSIS (SOEC) OR CO-ELECTROLYSIS REACTORS

CROSS-REFERENCE TO RELATED APPLICATIONS

This application claims the benefit of French Application No. FR 17 62904 filed on Dec. 22, 2017, the entire disclosure of which is hereby incorporated herein by reference.

Technical Field

The present invention relates to the field of the conversion of electricity into gas, more well known as "power-to-gas" conversion.

Power-to-gas conversion is based on the storage of the overproduction of renewable energies by virtue of the conversion thereof into synthesis methane or hydrogen. The existing natural gas networks may receive the hydrogen or methane thus produced and make it possible to store them, transport them and exploit them by mixing with natural gas.

The present invention relates to a power-to-gas unit, where the gas is in the form of methane, which implements a step of high-temperature electrolysis (HTE for "High-Temperature Electrolysis", or else HTSE for "High-Temperature Steam Electrolysis") of water or a step known as high-temperature co-electrolysis of water and carbon dioxide $CO_2$, within a plurality of electrolysis cell stack reactors of SOEC type (acronym for "Solid Oxide Electrolyzer Cell") which are supplied with electricity.

The invention relates more particularly to the production of methane using the electrolysis or co-electrolysis reactors of the unit, during starting or in the event of a low level of available electricity, according to a stand-by mode.

Prior Art

Among the bulk energy storage solutions already envisioned, hydraulic storage is already very widespread. The remaining capacities for this type of storage risk being rapidly saturated. In addition, hydraulic systems require particular geographic and geological conditions and may as a result prove to be quite expensive and to have a limited expansion potential. For the future storage problems, hydraulic storage may therefore be only a partial solution.

An alternative storage solution has also been envisioned: this is compressed air storage (CAES the acronym for "Compressed Air Energy Storage"). According to this technology, it is envisioned to store compressed air produced with electricity in underground cavities. These cavities themselves also require specific geological characteristics, such as saline cavities. However, the yield of this storage solution is unsatisfactory.

Finally, hydrogen is announced as an energy vector that may be capable of bulk storage of electricity in certain configurations: mention may be made here of the project already carried out in Corsica under the acronym MYRTE (Mission hYdrogéne Renouvelable pour l'Intégration au Réseau Electrique [Mission relating to renewable hydrogen for integration in the electrical network]) with the applicant's participation.

However, all these bulk energy storage solutions require the development of extensive infrastructures (sites suitable for hydraulics, underground cavities, hydrogen storage systems). This is why, more recently, bulk energy storage by conversion of renewable electricity into chemical energy via the production of synthetic fuel gas that may be stored in pre-existing infrastructures has made significant inroads, representing a storage alternative of great potential. Mention may be made here of patent application US 2009/0289227 which mentions technical conversion solutions.

Moreover, reducing the emissions of carbon dioxide $CO_2$ resulting from the use of fossil energies, exploiting as much as possible the $CO_2$ derived from the use of these energies rather than storing it for an indefinite period, using on demand electricity derived from "decarbonized" energy sources, in particular during periods of overproduction, converting this electricity into a storable product that may optionally make it possible to produce electricity on demand during periods of production deficit without having to resort to the use of high-carbon energies are all objectives to be achieved for the sake of global environmental efficiency.

The manufacture of a combustible syngas from steam and carbon dioxide $CO_2$, by means of "decarbonized" electricity, meets these objectives.

Thus, several studies have identified the power-to-gas solution as a solution with a high potential, through the conversion of this excess of electricity into syngas that may be stored and exploited by means of current gas infrastructures, in particular the natural gas transportation and distribution network. This use of existing infrastructures makes it possible to have bulk capacities for storage of energy from renewable sources without requiring specific investments in the storage (see publication [1]), which is not the case with the other electricity storage solutions, such as the pumping or CAES stations mentioned above.

For this reason, the power-to-gas solution is considered to be the energy conversion and storage solution to be preferred as long as the penetration of renewable energies will make it medium-term or even long-term (seasonal) electricity storage useful: [2], [3].

The production of a synthesis methane in a power-to-gas unit is particularly suitable for the exploitation of natural gas infrastructures: [1]. This methane is typically produced on the availability of electricity, by electrolysis of water (hydrogen production), then by carrying out, in a dedicated reactor, a methanation reaction between the hydrogen and the $CO_2$ from an external source.

The electrolysis of steam $H_2O$ to produce hydrogen $H_2$ and/or the co-electrolysis of $H_2O+CO_2$ at high temperature within a solid oxide electrolyzer is one of the possibilities for producing reagents that are of use in methanation. The reactions for steam electrolysis (I) and for co-electrolysis of $H_2O+CO_2$ (II) take place according to the following equations:

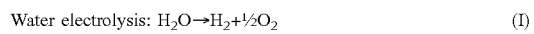

Water electrolysis: $H_2O \rightarrow H_2 + \tfrac{1}{2}O_2$ (I)

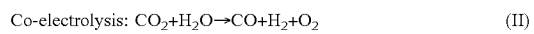

Co-electrolysis: $CO_2 + H_2O \rightarrow CO + H_2 + O_2$ (II)

High-temperature electrolysis in solid oxide cell (SOEC) reactors makes it possible to achieve a particularly high electrical yield compared with the low-temperature technologies, such as alkaline or PEM (acronym for "Proton Exchange Membrane") electrolysis, since the heat given off by the methanation reactor may be exploited within the process.

The SOEC co-electrolysis of steam and $CO_2$, to produce a syngas (mixture of $H_2$, CO and $CO_2$) which is then injected into the methanation reactor in order to produce synthesis methane, has the same advantage.

In addition, the transportation, the storage and the use, including the possible injection into the gas network, of hydrogen requires it to be pressurized. It is already known practice to carry out the electrolysis of water directly using pressurized steam, instead of compressing the hydrogen produced, which is expensive, the water therefore being compressed in the liquid state beforehand, which is much less expensive.

The production of hydrogen or syngas by HTE electrolysis or high-temperature co-electrolysis requires, by definition, electricity available in sufficient amount.

However, when "decarbonized" energy sources are by nature intermittent (wind power, solar power), situations may occur in which it is no longer possible, with such sources, to supply with electricity at the same time all the HTE electrolysis reactors or high-temperature co-electrolysis reactors of one and the same power-to-gas unit, or at the very least in an amount sufficient for the implementation to be effective.

Moreover, once such HTE/SOEC reactors allowing the high temperature electrolysis or co-electrolysis have been turned on, it is necessary to ensure that the temperature thereof is maintained, this being despite the possible intermittence of the electricity production, so as, on the one hand, to prevent thermal cycling that may damage it and, on the other hand, to offer possibilities for rapidly turning it on once electricity is again available. In other words, limiting the temperature variations at the level of the components of the reactors makes it possible to reduce the deterioration risk, and to facilitate the rapid turning on of the power-to-gas unit, in the event of low-cost electricity once again being available.

It is therefore advantageous to ensure that the SOEC reactors allowing the high temperature electrolysis or co-electrolysis reactors are maintained at high temperature during their period of inactivity, despite inevitable heat losses.

Several solutions have already been envisioned for solving this problem of maintaining the temperature of the SOEC or co-electrolysis reactors, in the absence of available electricity, this being despite the heat losses.

The first solution consists of electrical heating. This solution is not viable because of the energy and financial costs generated by the cost of the electricity, that is typically high during the stand-by period of the unit.

Another solution envisions a provision of heat by combustion of fossil fuel. Here again, the energy and financial costs of the fuel do not make this solution viable.

Another solution is to reverse the operation of each of the SOEC reactors, allowing the high temperature electrolysis or co-electrolysis, that is to say to make it operate as an SOFC fuel cell (acronym for "Solid Oxide Fuel Cell") so as to produce current from hydrogen $H_2$ from syngas (mixture of hydrogen $H_2$ and carbon monoxide CO), or from methane, thereby making it possible to maintain the reactor temperature. This has the major drawback of producing electric current that is not necessarily exploitable, once there is no longer electricity available from the external sources. In addition, another major drawback is that fuel, i.e. $H_2$, syngas or methane, is thus consumed, i.e. burnt, solely for the purposes of maintaining the reactor temperature and without obtaining any other combustible product, but only electricity which is not necessarily exploitable at that precise moment.

A final solution is that envisioned by the applicant in patent EP 3 077 574 B1. This solution is based on the capacity of an SOEC reactor to catalyze the exothermic methanation reaction, in order to ensure that it is maintained at temperature. In this operating scheme, an SOEC reactor operates, in a first step, in nominal mode, as a conventional electrolyzer/co-electrolyzer producing hydrogen $H_2$ or syngas, which is stored. In a second step, which corresponds to the stand-by mode, this same reactor is supplied with its own preceding production, with the addition of $CO_2$ in the event of the electrolysis having only produced hydrogen $H_2$ in a first step, thereby generating an internal methanation reaction from which the production of heat makes it possible to maintain the reactor temperature, without consuming fuel, but while progressing, on the contrary, to the production of methane. If it is still required, the methanation can then be finalized in a dedicated methanation reactor. This solution is satisfactory overall, but has certain drawbacks, as follows:

the intrinsic requirement to store the production of hydrogen or of syngas during nominal operation in electrolysis/co-electrolysis mode before reusing it in stand-by mode for maintaining the same reactor at temperature;

in the absence of temperature or pressure variation between the electrolysis/co-electrolysis and methanation phases, shifting the methanation reaction equilibrium, only the electrolysis with subsequent addition of the $CO_2$ reagent actually enables an exothermic methanation for maintaining at temperature;

since the exploitation of the methanation heat is not taken into account in the electrolysis/co-electrolysis operation mode, the stand-by mode operation thermally penalizes the upstream phase of electrolysis/co-electrolysis, making it necessary for there to be a thermal compensation which may have an impact on the overall energy consumption and may generate a loss of productivity.

There is therefore a need to improve the process for operating in stand-by mode a power-to-gas unit comprising several HTE/SOEC electrolysis reactors or co-electrolysis reactors, in order to maintain them at temperature in the absence of available electricity for all the reactors, in particular without having to reverse each of the reactors into an SOFC fuel cell and/or without having to burn $H_2$ or gas fuel that may be from synthesis and/or without having to store a prior production of hydrogen or of syngas.

The aim of the invention is to at least partly satisfy this need.

SUMMARY OF THE INVENTION

To do this, in one of its aspects, the invention relates to a process for operating in starting mode or in stand-by mode a unit, termed power-to-gas unit, comprising a number N of reactors (1) with a stack of elemental electrolysis cells of solid oxide (SOEC) type, the cathodes of which are made of methanation reaction catalyst material(s), the process comprising the following steps, when it is to be desired to carry out a temperature increase of the N reactors or a fraction thereof, or when the level of electricity available is insufficient to carry out an HTE electrolysis or a co-electrolysis of $H_2O$ and $CO_2$ within all of the N reactors:

a/ a number P of reactors are supplied with electricity and, if required, with heat, and either steam $H_2O$, or a mixture of steam and carbon dioxide $CO_2$ is supplied and distributed to the cathodes of the P reactors so as to carry out, at each cathode of the P reactors, either a high-temperature electrolysis of the steam $H_2O$, or a high-temperature co-electrolysis of steam and carbon dioxide, b/ at least one part of the gases resulting from the electrolysis (hydrogen $H_2$, steam $H_2O$) or from the co-electrolysis ($H_2$, steam, carbon monoxide CO, carbon dioxide $CO_2$, methane $CH_4$) is recovered and is supplied and distributed to each cathode of a number X of reactors not supplied with electricity, the number X being less than or equal to N-P, so as to carry out, at each cathode of the X reactors, a methanation by heterogeneous catalysis.

The invention thus consists of a heat management of all of the SOEC reactors of a power-to-gas unit, which provides that, in the event of a level of supply of electricity insufficient to be able to operate all the reactors in nominal mode, that is to say in electrolysis/co-electrolysis mode, typically 800° C., only some of them are operated in this mode, that is to say P reactors, the other portion of the reactors, i.e. X reactors, which is not fed with electricity, being increased to or maintained at a close and lowered temperature while at the same time remaining in the high-temperature range, typically above 600° C., or at a temperature compatible with the constraints of thermal cycling of the components, by internal methanation reaction within them using the injection of the gas products resulting from the electrolysis/co-electrolysis reactions in the P reactors, this being despite the heat losses.

According to one advantageous embodiment, the carbon dioxide is emitted by a production source.

Advantageously, in starting mode or in stand-by mode, the heat requirements of the unit are provided by the waste heat from a production source, which is preferably the same production source as that which emits the carbon dioxide.

The expression "production source which emits carbon dioxide $CO_2$ and/or a waste heat" is intended to mean here, and in the context of the invention, any production site, such as energy production sites (nuclear power stations for waste heat, biomass methanization or gasification power stations for $CO_2$ emission and/or waste heat), industrial production sites (cement works, steel industries for $CO_2$ emission and/or waste heat), service industry buildings which emit all the more heat since they are high consumers of heat, such as hospitals, enclosed-area transportation networks, or else elimination sites, such as waste heat treatment units, etc.

Thus, maintaining all of the SOEC reactors of the power-to-gas unit in stand-by mode at high temperature, typically between 600 and 800° C., is made possible despite the intrinsic heat losses, by the exploitation of external heat at medium temperature, typically between 200 and 300° C., preferably a residual/excess heat, more preferably linked to a $CO_2$ emission source.

Once they have passed through the X SOEC reactors not supplied with electricity, the gases produced may be introduced into the dedicated methanation reactors of the power-to-gas unit, in order to finalize the production of synthesis methane. Thus, according to one advantageous embodiment, the process comprises a step c/ according to which the gases produced by methanation in the SOEC reactors during step b/ are introduced into the methanation-dedicated reactors of the power-to-gas unit.

Preferably, step a/ is carried out at temperatures between 600° C. and 1000° C.

Again preferably, step b/is carried out at temperatures between 400° C. and 800° C. or at a temperature compatible with the constraints of thermal cycling of the components, and inferior to at least 100° C. to the temperature of step a/.

Advantageously, steps a/ and b/ are carried out at pressures of between 0 and 100 bar, preferably of between 4 and 80 bar.

The N reactors are preferably all reactors with a stack of elemental electrolysis cells of SOEC type, each formed from a cathode, an anode and an electrolyte inserted between the cathode and the anode, and a plurality of electrical and fluid interconnectors, each arranged between two adjacent elemental cells with one of its faces in electrical contact with the anode of one of the two elemental cells and the other of its faces in electrical contact with the cathode of the other of the two elemental cells.

It is specified here that the electrical and fluid interconnection devices, also called interconnectors or else interconnecting plates, are the devices which provide the connection in series from an electrical point of view of each electrolysis cell in the stack of HTE reactors and in parallel from a fluidic point of view, thus combining the production of each of the cells. The interconnectors thus perform the functions of supplying and collecting current and delimit gas circulation (distribution and/or collection) compartments.

The electrolysis cells are advantageously of cathode-supported type. The term "cathode-supported cell" is intended to mean, here and in the context of the invention, the definition already given in the field of high-temperature electrolysis HTE of water and denoted under the acronym CSC for "Cathode-supported Cell", that is to say a cell in which the electrolyte and the oxygen electrode ("anode") are placed on the thicker hydrogen or carbon monoxide electrode (cathode) which then acts as a support.

The cathodes are preferably based on nickel (Ni) supported by zirconium ($ZrO_2$), preferably stabilized with yttrium oxide ($Y_2O_3$), or based on Ni supported by ceria, such as gadolinium-doped ceria (Ni-CGO).

For step a/, the co-electrolysis of steam and carbon dioxide may advantageously be carried out in the stack reactor according to the teaching of patent EP 2 931 943 B1: either steam $H_2O$, or a mixture of steam and carbon dioxide $CO_2$, is supplied and distributed to each cathode of the P reactors, or steam is supplied and distributed to each cathode of one of the two adjacent elemental cells of the P reactors and carbon dioxide is supplied and distributed to the cathode of the other of the two elemental cells of the P reactors, so as to carry out, at each cathode of the P reactors, either a high-temperature electrolysis of the steam $H_2O$, or a high-temperature co-electrolysis of steam and of carbon dioxide.

A subject of the invention is also a process for producing methane $CH_4$ from an "intermittent" energy source, implementing the process for operating on stand-by mode a power-to-gas unit described above, step b/ being carried out when said intermittent source is no longer able to produce the level of electricity sufficient for all the N reactors. The invention which has just been described has many advantages, among which mention may be made of:

maintaining of the entire unit at high temperature, typically between 600 and 800° C., despite an operation at load which may be very partial in a context of surplus-electricity intermittence;

no fuel consumption for maintaining at high temperature, and no need to switch into SOFC fuel cell mode to do so;

maintaining of the electrical yield of the unit, during the operation at partial load, in the case of the availability of a medium-temperature residual/excess heat source advantageously linked to an industrial $CO_2$ production source;

maintaining of a reducing atmosphere ($H_2/CO/H_2O/CO_2$) by flushing the X SOEC reactors in stand-by mode, thereby limiting the risks of oxidation and the need for inerting or flushing with another reducing gas, for example with hydrogen;

possibility of using the stand-by mode according to the invention for increasing the temperatures of the SOEC reactors of the unit, which are initially cold. Thus, following preheating at medium temperature, typically at around 300° C., for example in connection with the external heat source, the introduction of the reagents from an electrolyzer/co-electrolyzer supplied with electricity makes it possible to gradually increase, by methanation, the temperature of the other X reactors, thereby thus generating savings regarding the specific start-up equipment and making possible a rapid electrochemical startup;

ease of implementation of the stand-by temperature, typically around 600 to 700° C., by controlling the flow rates of reagents injected into each of the X inactive SOEC reactors, that is to say which are not supplied with electricity.

DETAILED DESCRIPTION

Other advantages and features of the invention will emerge more clearly on reading the detailed description of examples of implementation of the invention given by way of illustration and in non-limiting manner with reference to the following figures among which:

Throughout the present application, the terms "inlet", "outlet", "downstream" and "upstream" should be understood with reference to the direction of circulation of the gases from their inlet into the SOEC reactor to their outlet therefrom.

Figure 1:
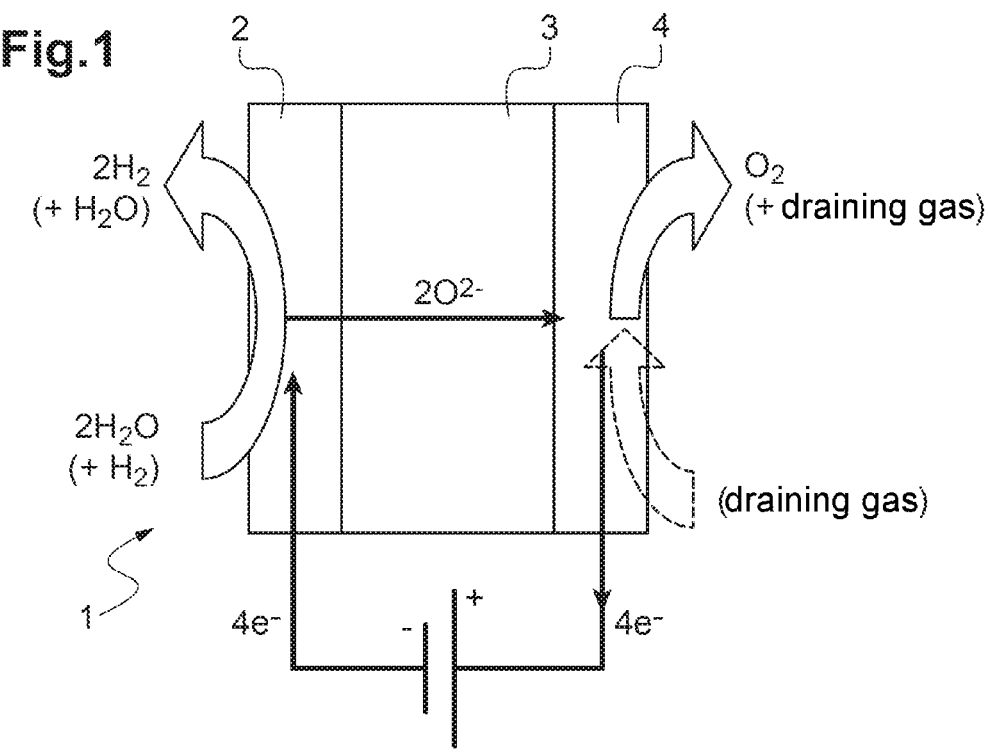
FIG. 1 is a diagrammatic view showing the operating principle of a high-temperature water electrolyzer.
Figure 2:
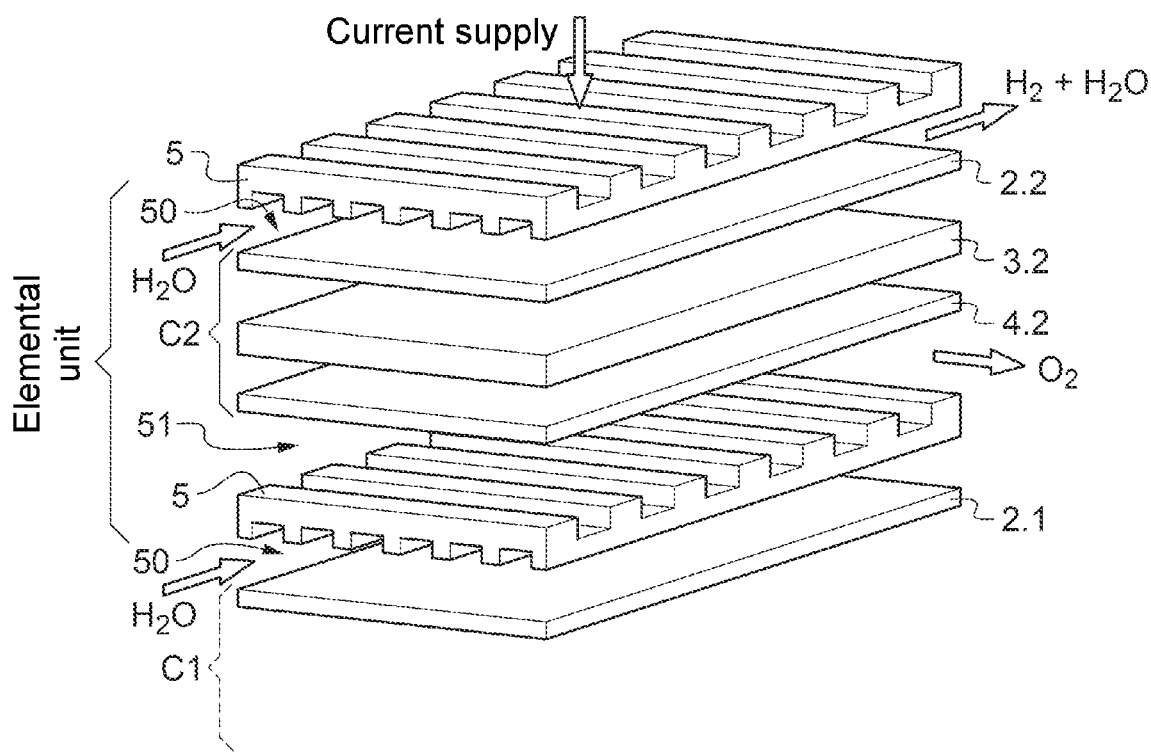
FIG. 2 is an exploded diagrammatic view of a part of a high-temperature steam electrolyzer comprising interconnectors.

It is specified that, in FIGS. 1 and 2, the symbols and the arrows for supply of steam $H_2O$, for distribution and recovery of dihydrogen $H_2$, of oxygen $O_2$ and of the current, and of carbon dioxide $CO_2$, and for distribution and recovery of carbon monoxide CO and of oxygen $O_2$ and of the current, and of methane $CH_4$ are shown for the purposes of clarity and precision, in order to illustrate the operation of an SOEC reactor 1 according to the invention.

It is also specified that all the reactors operating according to steps a/ and b/ of the process according to the method that are described are of solid oxide (SOEC, acronym for "Solid Oxide Electrolyzer Cell") type operating at high temperature. Thus, all the constituents (anode/electrolyte/cathode) of an electrolysis cell are ceramic.

Such constituents may be those of an SOFC fuel cell. The high operating temperature in nominal mode of the reactor 1 during the electrolysis or the co-electrolysis is typically between 600° C. and 1000° C.

Typically, the characteristics of an elemental SOEC electrolysis cell suitable for the invention, of the cathode-supported cell (CSC) type, may be those indicated as follows in Table 2 below.

TABLE 2

| Electrolysis cell | Unit | Value |
|---|---|---|
| Cathode 2 | | |
| Constituent material | | Ni—YSZ |
| Thickness | μm | 315 |
| Thermal conductivity | W m$^{-1}$ K$^{-1}$ | 13.1 |
| Electricity conductivity | Ω$^{-1}$ m$^{-1}$ | 10$^5$ |
| Porosity | | 0.37 |
| Permeability | m$^2$ | 10$^{-13}$ |
| Tortuosity | | 4 |
| Current density | A · m$^{-2}$ | 5300 |
| Anode 4 | | |
| Constituent material | | LSM |
| Thickness | μm | 20 |
| Thermal conductivity | W m$^{-1}$ K$^{-1}$ | 9.6 |
| Electricity conductivity | Ω$^{-1}$ m$^{-1}$ | 1 10$^4$ |
| Porosity | | 0.37 |
| Permeability | m$^2$ | 10$^{-13}$ |
| Tortuosity | | 4 |
| Current density | A · m$^{-2}$ | 2000 |
| Electrolyte 3 | | |
| Constituent material | | YSZ |
| Thickness | μm | 5 |
| Resistivity | Ω m | 0.42 |

A water electrolyzer is an electrochemical device for producing hydrogen (and oxygen) under the effect of an electric current.

In HTE high-temperature electrolyzers, the electrolysis of water at high temperature is carried out using steam. The function of an HTE high-temperature electrolyzer is to convert the steam into hydrogen and oxygen according to the following reaction:

$$2H_2O \rightarrow 2H_2 + O_2.$$

This reaction is carried out electrochemically in the cells of the electrolyzer. As represented diagrammatically in FIG. 1, each elemental electrolysis cell 1 is formed from a cathode 2 and an anode 4, placed on either side of a solid electrolyte 3. The two electrodes (cathode and anode) 2, 4 are electron conductors, made of porous material, and the electrolyte 3 is gas-tight, an electron insulator and an ion conductor. The electrolyte may in particular be an anionic conductor, more specifically an anionic conductor of $O^{2-}$ ions and the electrolyzer is then referred to as an anionic electrolyzer.

The electrochemical reactions take place at the interface between each of the electron conductors and the ionic conductor.

At the cathode 2, the half-reaction is the following:

$$2H_2O + 4e^- \rightarrow 2H_2 + 2O^{2-}.$$

At the anode 4, the half-reaction is the following:

$$2O^{2-} \rightarrow O_2 + 4e^-.$$

The electrolyte 3 inserted between the two electrodes 2, 4 is the site of migration of the $O^{2-}$, ions under the effect of the electric field created by the potential difference imposed between the anode 4 and the cathode 2.

As illustrated in parentheses in FIG. 1, the steam at the cathode inlet can be accompanied by hydrogen $H_2$ and the hydrogen produced and recovered at the outlet may be accompanied by steam. Likewise, as illustrated with dashed lines, a draining gas, such as air, may also be injected at the inlet in order to remove the oxygen produced. The injection of a draining gas has the additional function of acting as a heat regulator.

An elemental electrolysis reactor consists of an elemental cell as described above, with a cathode 2, an electrolyte 3, and an anode 4, and of two mono-polar connectors which ensure the electrical, hydraulic and thermal functions.

To increase the flow rates of hydrogen and oxygen produced, it is known practice to stack several elemental electrolysis cells on top of one another, separating them with interconnection devices, usually known as interconnectors or bipolar interconnecting plates. The assembly is positioned between two end interconnecting plates which support the electrical feeds and gas feeds of the electrolyzer (electrolysis reactor).

A high-temperature water electrolyzer (HTE) thus comprises at least one, generally a plurality of, electrolysis cells stacked on top of each other, each elemental cell being formed from an electrolyte, a cathode and an anode, the electrolyte being inserted between the anode and the cathode.

The fluid and electrical interconnection devices that are in electrical contact with one or more electrodes generally perform the functions of conveying and collecting electric current and delimit one or more gas circulation compartments.

Thus, a "cathode" compartment has the function of distributing the electrical current and steam and also recovering hydrogen at the cathode in contact.

An "anode" compartment has the function of distributing the electric current and also recovering the oxygen produced at the anode in contact, optionally using a draining gas.

FIG. 2 represents an exploded view of elemental units of a high-temperature steam electrolyzer according to the prior art. This HTE electrolyzer comprises a plurality of elemental electrolysis cells C1, C2, of solid oxide (SOEC) type stacked alternately with interconnectors 5. Each cell C1, C2 . . . consists of a cathode 2.1, 2.2, . . . and of an anode 4.1, 4.2, between which is placed an electrolyte 3.1, 3.2 . . . .

The interconnector 5 is a component made of metal alloy which ensures separation between the cathode compartment 50 and the anode compartment 51, defined by the volumes between the interconnector 5 and the adjacent anode 4.2 and between the interconnector 5 and the adjacent cathode 2.1, respectively. It also ensures the distribution of the gases to the cells. The injection of steam into each elemental unit takes place in the cathode compartment 50. The collecting of the hydrogen produced and of the residual steam at the cathode 2.1, 2.2 . . . is performed in the cathode compartment 50 downstream of the cell C1, C2 . . . after dissociation of the steam by the latter. The collecting of the oxygen produced at the anode 4.2 is performed in the anode compartment 51 downstream of the cell C1, C2 . . . after dissociation of the steam by the latter.

The interconnector 5 ensures the passage of the current between the cells C1 and C2 by direct contact with the adjacent electrodes, i.e. between the anode 4.2 and the cathode 2.1.

In the HTE high-temperature co-electrolyzers, the high-temperature co-electrolysis is carried out using steam and carbon dioxide $CO_2$. The function of an SOEC high-temperature co-electrolyzer is to convert the steam and the $CO_2$ into hydrogen, carbon monoxide and oxygen according to the following reaction:

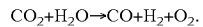

$$CO_2 + H_2O \rightarrow CO + H_2 + O_2.$$

A co-electrolyzer 1 may comprise exactly the same solid oxide constituents (SOEC) as an HTE electrolyzer that has just been described. Usually, the steam and the carbon dioxide $CO_2$ are mixed, in ratios chosen according to the application, before entry into the co-electrolyzer and injected simultaneously into each cathode compartment 50.

Figure 3:
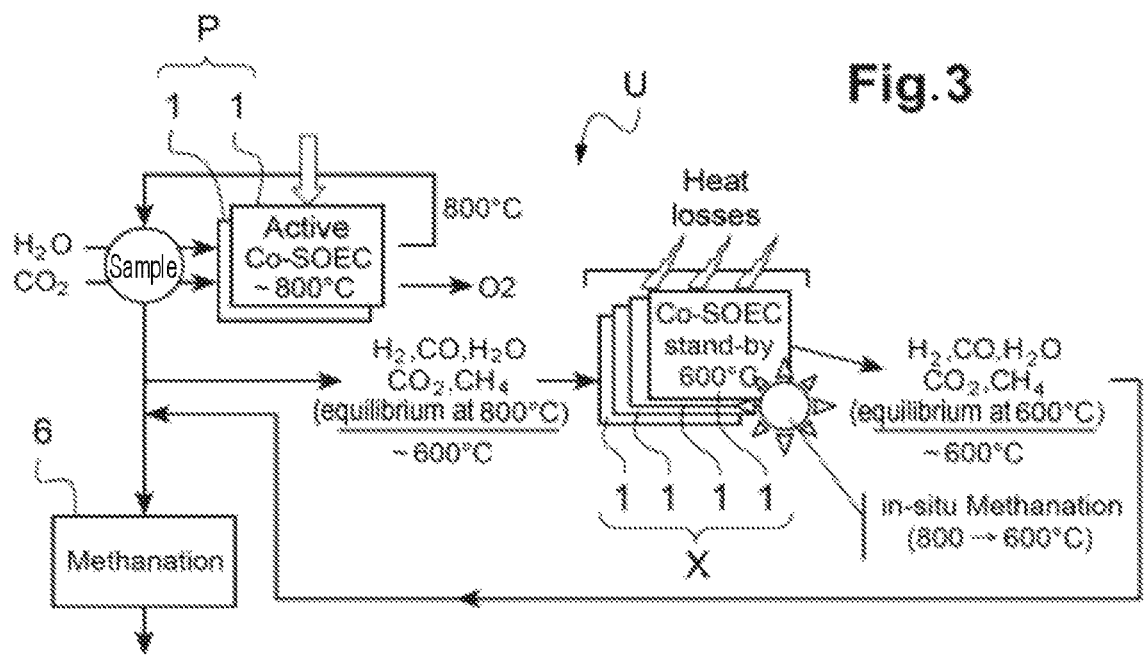
FIG. 3 is a diagrammatic view of the operation in stand-by mode according to the invention of a power-to-gas unit.

Represented in FIG. 3 is a power-to-gas unit U which uses a large number X and P of co-electrolysis reactors upstream of a plurality of dedicated methanation reactors 6.

This FIG. 3 illustrates an example of the process for operating this unit U in stand-by mode according to the invention: in this case, a number P of reactors 1 is supplied with electricity and operates in co-electrolysis mode, while the resulting X reactors, which are not supplied with electricity, are supplied with a portion of the gas products resulting from the co-electrolysis of the P reactors.

The example given corresponds to a power-to-gas unit with a co-electrolysis power of 20 MWe in nominal operation, which is coupled to an industrial source, typically a steel industry which emits $CO_2$ and a heat of medium temperature at around 200° C.

For this 20 MWe co-electrolysis power and under the chosen operating conditions of an SOEC reactor, i.e. with a heat-neutral operation at a voltage of 1.33 V, a current density of 1.1 A/cm$^2$ and under a pressure of 10 bar, the power-to-gas unit U comprises a number N equal to 1855 SOEC reactors 1, which corresponds to a stack of 50 cells C1, C2 . . . , each of 196 cm$^2$.

This number N of 1855 reactors is grouped together in 53 chambers of 35 reactors each.

The nominal operation, i.e. with a 100% load, of the power-to-gas unit comprises the following steps:

a step of 20 MWe co-electrolysis by all of the 1855 SOEC reactors operating in parallel, supplied with steam and carbon dioxide $CO_2$, from a capture upstream at the outlet of the industrial source, at high temperature (800° C.) and producing a mixture of $H_2$, CO, $H_2O$ and $CO_2$;

a step of partial condensation of the steam at the outlet of the co-electrolysis reactors;

a passage through one of several (in parallel) first dedicated catalytic methanation reactor(s) 6;

after a step of intermediate condensation of the steam, passage through one of several (in parallel) second dedicated catalytic methanation reactor(s) 6, which finalize(s) the reaction for methanation of $H_2$, CO and $CO_2$ so as to produce therefrom methane $CH_4$;

a step of more thorough condensation of the water so as to obtain a synthesis methane with injection specifications for the natural gas network.

In addition, in nominal operation, the power-to-gas unit U has a thermal integration according to which the heat from the methanation reactors 6 is in particular fully used to vaporize the water at the inlet of the co-electrolysis reactors 1.

The supply of electricity to the unit U is ensured by a surplus of electricity production from renewable energies. This surplus has been estimated at 1800 h/year with a forecast of 10 years.

Working with a hypothesis of nominal operation of the unit only during surplus hours, long periods of stand-by should thus be envisioned over the year, during which the electrical needs are supplied by purchase from the electrical network.

The operating in stand-by mode according to the invention, as illustrated in FIG. 3, consists in carrying out the following steps:

a/ a number P of reactors of the unit U is supplied with electricity and either steam H$_2$O, or a mixture of steam and carbon dioxide CO$_2$, is supplied and distributed to the cathodes of the P reactors, so as to carry out, at each cathode of the P reactors, either a high-temperature electrolysis of the steam H$_2$O, or a high-temperature co-electrolysis of steam and carbon dioxide, b/ at least one part of the gases resulting from the electrolysis (hydrogen H$_2$, steam H$_2$O) or the co-electrolysis (H$_2$, steam, carbon monoxide CO, carbon dioxide CO$_2$, methane CH$_4$) is recovered and is supplied and distributed to each cathode of a number X of reactors not supplied with electricity, of the unit U, the number X being less than or equal to N-P, so as to carry out, at each cathode of the X reactors, a methanation by heterogeneous catalysis.

By applying the steps according to the invention, a heat management strategy in stand-by mode has been implemented as follows:

evaluation of the heat losses at 4.64 kWth per chamber containing 35 reactors in stand-by;

the products from the P reactors are injected into the other X SOEC reactors, so as to enable an internal methanation according to the following exothermic reactions, thermodynamically promoted by a lowering of the temperature:

$$CO_2 + 4H_2 \rightarrow CH_4 + 2H_2O.$$

$$CO + 3H_2 \rightarrow CH_4 + H_2O.$$

Figure 4:
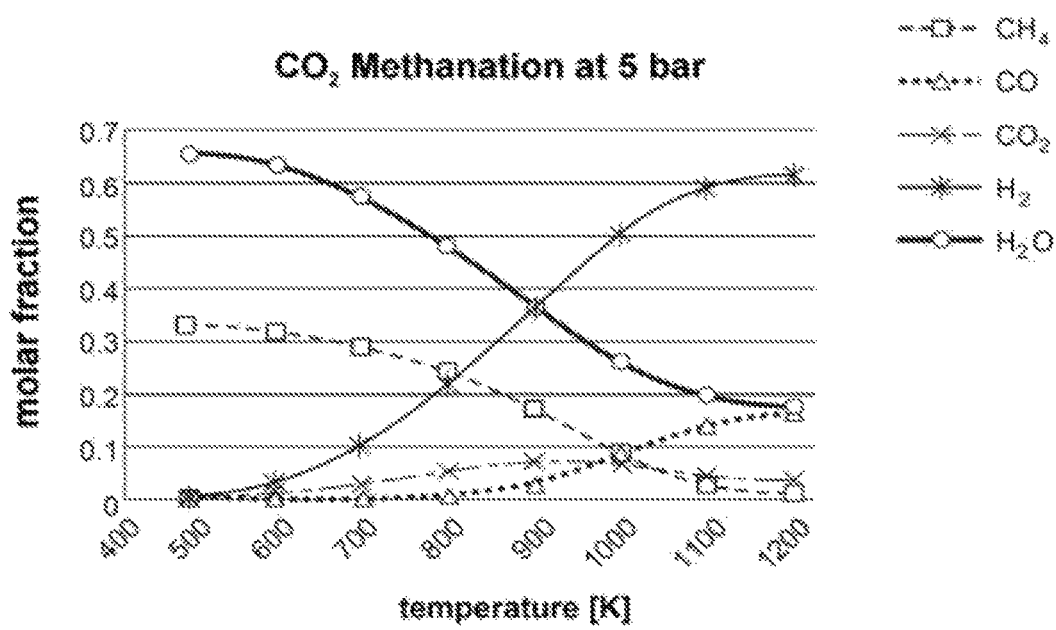
FIG. 4 illustrates, in the form of curves, the change in the degree of conversion to methane with the lowering of the temperature within a non-active reactor of the unit, for a typical mixture of $H_2$, CO, $CO_2$ and $H_2O$ at the outlet of an active co-electrolysis reactor of the unit.

An example of change in methane production under 5 bar of pressure is shown in FIG. 4;

a thermodynamic calculation of the shift in the methanation reaction equilibrium between the active P reactors (800° C.) and the inactive X reactors (600° C.) has shown that an active co-electrolysis reactor at 800° C. under a pressure of 10 bar makes it possible to maintain the temperature of seven SOEC reactors at 600° C. without supply of electricity, that is to say operating of the unit U at only 12.5% load.

This operating strategy in stand-by mode according to the invention thus clearly makes it possible to maintain at high temperature all the N SOEC reactors, in return for which there is a consumption of electricity of only 12.5% of the nominal operation, i.e. P=12.5% of the number N with X=N-P.

As shown in FIG. 3, once used for keeping the X inactive SOEC reactors hot, the reagents finalize their methanation in the dedicated methanation reactors 6, as for the nominal operation.

The power-to-gas unit U according to the invention thus continues to implement the exploitation of the electricity to synthesis methane, but at a reduced load.

The inventors have carried out a thermal integration of a unit U, by means of the "ProSimPlus" commercial modelling software, in order to carry out an overall heat balance in the two operating modes, namely nominal operating and operating in stand-by mode according to the invention.

Figure 5:
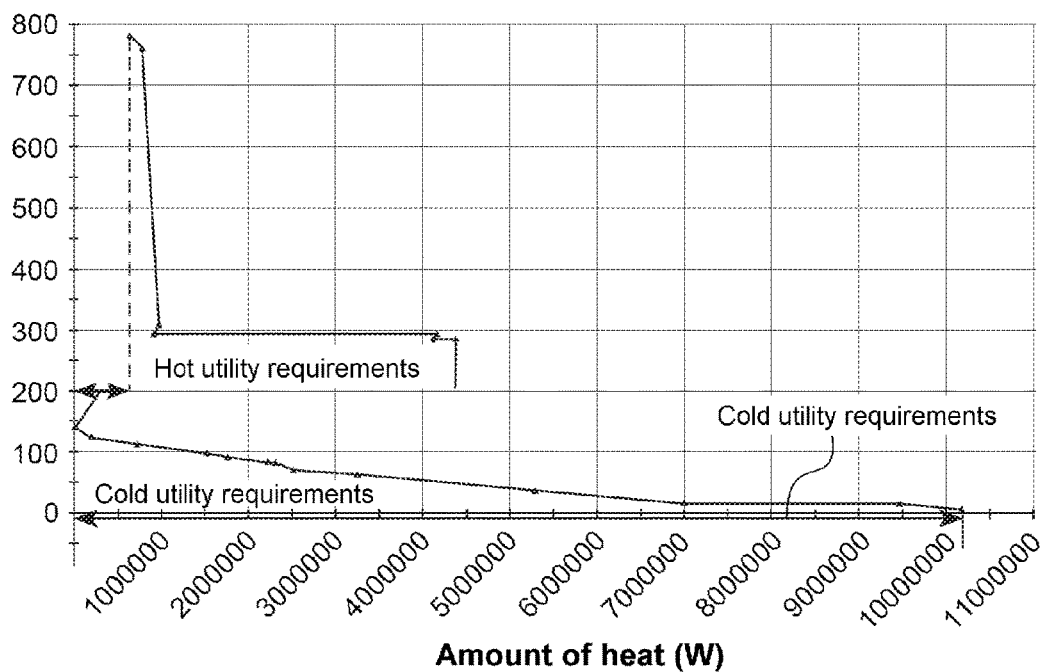
FIG. 5 represents the major composite curve, that is to say the variation in the amounts of heat exchanged in each temperature range and also the energies to be supplied by the utilities, or the exploitation of an externally provided thermal energy, of an example of a power-to-gas unit, in nominal operating mode.
Figure 6:
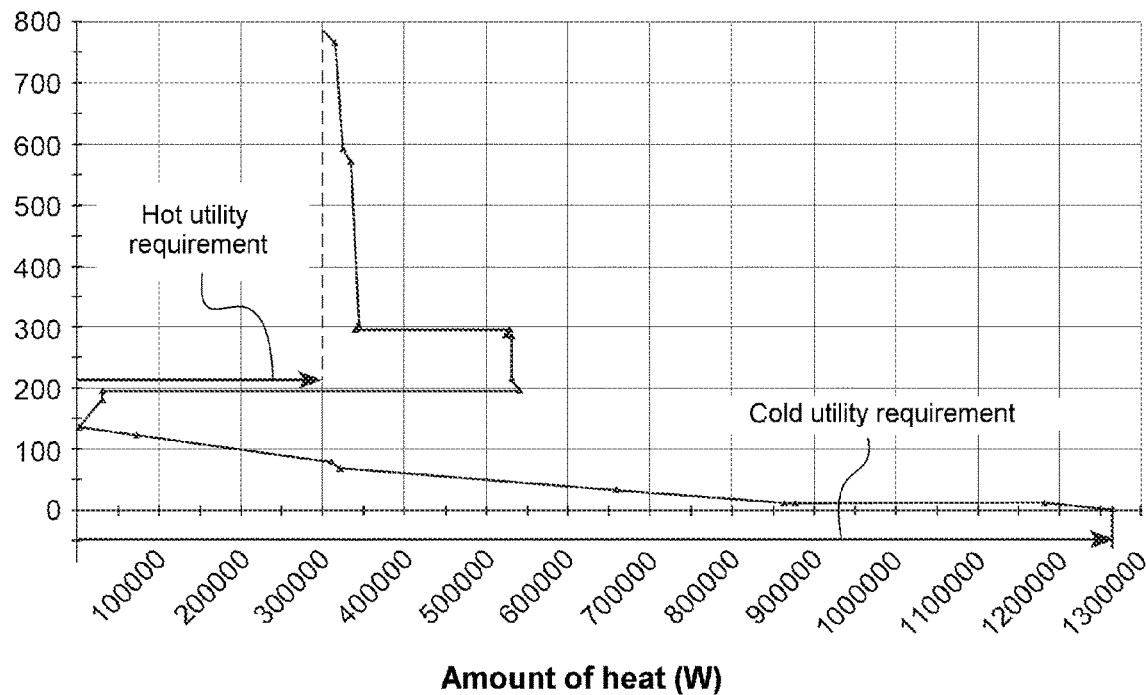
FIG. 6 represents the major composite curve of the same example of a unit as according to FIG. 5, but in stand-by mode according to the invention.

This balance is illustrated respectively in FIG. 5 (nominal operating mode) and in FIG. 6 (stand-by mode according to the invention). It is specified that, according to their usual definitions, the cold utilities are the cooling fluids used for discharging the excess heat from the unit typically at low temperature, while the hot utilities are the heating additions used to meet the heat requirements of the unit typically at medium or high temperature.

From the curves illustrated in FIGS. 5 and 6, the heat balance shows:

cold utility needs for the unit, which are by assumption supplied through consumptions of electricity, for example from an air-cooled exchanger or a heat pump;

hot utility needs, which are however limited to a temperature close to ~200° C.:

for the operating in nominal mode, which is normal;

likewise for the operating in stand-by mode, by virtue of the heat strategy deployed, this being despite the maintaining at high temperature and the heat losses on the X SOEC reactors which are not supplied with electricity.

If the unit is coupled with an industrial source which emits both CO$_2$ and residual/excess heat at medium temperature, this need for hot utilities at medium temperature does not have to be compatibilized in the electrical balance of the unit.

The results of the thermal calculation by the ProSimPlus software, and also of the electrical yield of a power-to-gas unit are illustrated in Table 1 below, for the nominal and stand-by operating modes in accordance with the invention with a load of 12.5% of the nominal.

TABLE 1

| Operating mode | Nominal | Stand-by according to the invention |
|---|---|---|
| Electricity (MW) including cold utility | 24.59 | 3.07 |
| Water consumption (t/h) | 2.56 | 0.32 |
| Methane CH$_4$ production (t/h) | 1.11 | 0.14 |
| Oxygen production (t/h) | 4.49 | 0.56 |
| Yield (%) | 69.1 | 69.1 |

From this Table 1, it emerges that the electrical yield of the unit U is maintained at partial load, despite the heat requirements for maintaining at high temperature the X reactors which are not supplied with electricity.

The invention is not limited to the examples which have just been described; features of the examples illustrated in variants that are not illustrated may in particular be combined with one another.

REFERENCES CITED

[1]: *"Etude portant sur l'hydrogéne et la méthanation comme procédé de valorisation de l'électricité excédentaire"* ["Study relating to hydrogen and methanation as a process for exploiting excess electricity"]—ADEME, GRTgaz, GrDF; September 2014;

[2]: "Sensitivities of Power-to-Gas within an optimized Energy System"; E. Kotter; IRES-2015

[3]: *"Energy Storage for a Greenhouse Gas Neutral Society: Demand and Long-term Strategy"*; M. Nowakowski; IRES-2015

The invention claimed is:

1. A process for operating in starting mode or in stand-by mode a unit, termed power-to-gas unit, comprising a number N of reactors with a stack of solid oxide (SOEC) type elemental electrolysis cells, the cathodes of which are made of methanation reaction catalyst material(s), wherein, when it is desired to carry out an increase in temperature of the N reactors or of a fraction thereof, or when a level of available electricity is insufficient to carry out a high-temperature electrolysis (HTE) or a co-electrolysis of $H_2O$ and $CO_2$ within all of the N reactors, the process comprises the following steps:

a/ a number P of reactors are supplied with electricity and, if required, with heat, and either steam $H_2O$, or a mixture of steam and carbon dioxide $CO_2$ is supplied and distributed to the cathodes of the P reactors so as to carry out, at each cathode of the P reactors, either a high-temperature electrolysis (HTE) of the steam $H_2O$, or a high-temperature co-electrolysis of steam and carbon dioxide, b/ at least one part of the gases resulting from the electrolysis (hydrogen $H_2$, steam $H_2O$) or from the co-electrolysis ($H_2$, steam, carbon monoxide CO, carbon dioxide $CO_2$, methane $CH_4$) is recovered and is supplied and distributed to each cathode of a number X of reactors not supplied with electricity, the number X being less than or equal to N-P, so as to carry out, at each cathode of the X reactors, a methanation by heterogeneous catalysis.

2. The operating process according to claim 1, wherein the carbon dioxide is emitted by a production source from a production site, the production site optionally comprising at least one from energy production sites optionally comprising nuclear power stations for waste heat and/or biomass methanization or gasification power stations for $CO_2$-emission and/or waste heat, industrial production sites optionally comprising cement works and/or steel industries for $CO_2$ emission and/or waste heat, service industry buildings optionally comprising hospitals, closed-site transportation networks, elimination sites optionally comprising waste heat treatment units.

3. The operating process according to claim 1, wherein, in stand-by mode, the heat requirements of the hot utilities of the unit, including the reactors (SOEC), are supplied by a waste heat of a production source, of a production site.

4. The operating process according to claim 3, wherein the production site is chosen from energy production sites optionally comprising nuclear power stations for the waste heat and/or biomass methanization or gasification power stations for $CO_2$-emission and/or waste heat, industrial production sites optionally comprising cement works and/or steel industries for $CO_2$ emission and/or waste heat, service industry buildings optionally comprising hospitals and/or closed-site transportation networks, elimination sites.

5. The operating process according to claim 1, comprising a step c/ wherein the gases produced by methanation produced by step b/ are introduced into the N dedicated methanation reactors of the power-to-gas unit.

6. The operating process according to claim 1, wherein step a/ is carried out at temperatures of between 800° C. and 1000° C.

7. The operating process according to claim 1, wherein step b/ is carried out at temperatures of between 600° C. and 800° C.

8. The operating process according to claim 1, wherein steps a/ and b/ are carried out at pressures of between 0 and 100 bar, preferably of between 4 and 80 bar.

9. The operating process according to claim 1, the N reactors all being reactors with a stack of elemental electrolysis cells of SOEC type, each formed from a cathode, an anode and an electrolyte inserted between the cathode and the anode, and a plurality of electrical and fluid interconnectors, each arranged between two adjacent elemental cells with one of its faces in electrical contact with the anode of one of the two elemental cells and the other of its faces in electrical contact with the cathode of the other of the two elemental cells.

10. The operating process according to claim 9, wherein step a/ is carried out by supplying and distributing to each cathode of the P reactors either steam $H_2O$, or a mixture of steam and carbon dioxide $CO_2$, or by supplying and distributing steam to each cathode of one of the two adjacent elemental cells of the P reactors and carbon dioxide is fed and distributed to the cathode of the other of the two elemental cells of the P reactors, so as to carry out, at each cathode of the P reactors, either a high-temperature electrolysis of the steam $H_2O$, or a high-temperature co-electrolysis of steam and of carbon dioxide.

11. The process for producing methane $CH_4$ from an "intermittent" energy source, implementing the process for operating in stand-by mode a power-to-gas unit according to claim 1, wherein step b/ is carried out when said intermittent source is no longer capable of producing the level of electricity sufficient for all the N reactors.

* * * * *